(12) United States Patent
Olsen (10) Patent No.: US 7,649,559 B2
(45) Date of Patent: Jan. 19, 2010

(54) AMPLIFIER OFFSET CANCELLATION DEVICES, SYSTEMS, AND METHODS

(75) Inventor: Alf Olsen, Oslo (NO)

(73) Assignee: Aptina Imaging Corporation, George Town (KY)

( * ) Notice: Subject to any disclaimer, the term of this patent is extended or adjusted under 35 U.S.C. 154(b) by 486 days.

(21) Appl. No.: 11/513,650

(22) Filed: Aug. 30, 2006

(65) Prior Publication Data

US 2008/0074521 A1  Mar. 27, 2008

(51) Int. Cl.
H04N 5/217 (2006.01)
H03K 17/60 (2006.01)
H03F 3/45 (2006.01)

(52) U.S. Cl. .................. 348/300; 348/241; 327/491; 330/260

(58) Field of Classification Search .......... 348/241, 348/300; 326/43, 126; 327/491; 330/153, 330/260, 291
See application file for complete search history.

(56) References Cited

U.S. PATENT DOCUMENTS

| | | | |
|---|---|---|---|
| 5,319,450 A | 6/1994 | Tamayama et al. | |
| 5,349,380 A | 9/1994 | Stein | |
| 5,636,048 A * | 6/1997 | Kogure et al. ............... | 398/202 |
| 5,892,540 A | 4/1999 | Kozlowski et al. | |
| 5,912,703 A | 6/1999 | Tamayama | |
| 6,031,399 A | 2/2000 | Vu et al. | |
| 6,067,113 A | 5/2000 | Hurwitz et al. | |
| 6,166,367 A * | 12/2000 | Cho ......................... | 250/208.1 |
| 6,288,387 B1 | 9/2001 | Black et al. | |
| 6,288,666 B1 | 9/2001 | Afghahi et al. | |
| 6,344,651 B1 | 2/2002 | Woolaway et al. | |
| 6,396,733 B1 | 5/2002 | Lu et al. | |
| 6,476,864 B1 | 11/2002 | Borg et al. | |
| 6,771,131 B2 | 8/2004 | Wilson et al. | |
| 6,783,073 B2 | 8/2004 | Yahagi et al. | |
| 6,803,555 B1 | 10/2004 | Parrish et al. | |
| 6,911,858 B2 | 6/2005 | Mori | |
| 7,008,816 B2 | 3/2006 | McClure | |
| 7,046,284 B2 | 5/2006 | Kozlowski et al. | |
| 7,061,413 B2 | 6/2006 | Boemler | |
| 2004/0099886 A1 | 5/2004 | Rhodes et al. | |
| 2004/0099892 A1 | 5/2004 | Agarwal | |
| 2005/0116769 A1 | 6/2005 | Tei et al. | |

* cited by examiner

*Primary Examiner*—Sinh Tran
*Assistant Examiner*—Mark Monk (57) ABSTRACT

Methods, devices, and systems for offset cancellation in an amplifier are disclosed, wherein the amplifier inputs may be exposed to large loads from an array of pixel columns coupled in parallel. During a cancellation phase, an amplifier offset may be canceled by selectively coupling a first amplifier output to a first amplifier input and a second amplifier output to a second amplifier input. During a portion of the cancellation phase, a buffer may use the first amplifier input to drive a first pixel signal. During a different portion of the cancellation phase, the buffer may use the second amplifier input to drive a second pixel signal. To sense the pixel columns during an amplification phase, the first and second pixel signals are coupled to the first and second amplifier inputs, respectively, with the result that the amplifier offset and the buffer offset are cancelled from the amplifier output.

30 Claims, 7 Drawing Sheets

AMPLIFIER OFFSET CANCELLATION DEVICES, SYSTEMS, AND METHODS

BACKGROUND OF THE INVENTION

1. Field of the Invention

Embodiments of the present invention relate to amplifier circuits. More specifically, the present invention relates to offset cancellation in amplifiers used in semiconductor imaging devices.

2. Description of Related Art

Many systems include imaging devices to sense and capture optical images that can be electronically converted to a digital representation of the image. Image sensors include an array of photo-sensitive devices such as photodiodes or photo-transistors fabricated on, for example, a complementary metal oxide semiconductor (CMOS) device. Each photosensitive device is sensitive to light in such a way that it can create an electrical charge that is proportional to the intensity of light striking the photo-sensitive device. The overall image captured by an image sensor includes many pixels arranged in an array such that each pixel detects the light intensity at the location of that pixel. A single pixel may include a single photo-sensitive device configured for detecting a broad frequency range, which may be used for gray scale images. In addition, a pixel may be defined as a single photo-sensitive device configured for detecting a specific color (i.e., frequency). Finally, a pixel may be defined as a group of photo-sensitive devices arranged near each other wherein different devices within the group are configured for detecting different colors. Thus, a full color image may be detected with the proper combination of color sensing pixels.

In a conventional CMOS imager, each pixel cell in an array of pixels operates to convert light intensity to electrical charge, accumulate the electrical charge in proportion to the light intensity, and transfer the accumulated charge to an amplifier. In many CMOS imagers, a pixel may be reset to a specific reference voltage level prior to, or after, acquiring the image. This reference level may be used to compare a voltage level read from the pixel after exposure to light relative to the reference voltage level. With this configuration, a differential amplifier, or comparator, may be used to determine the difference between the exposed voltage level of a pixel and the reference voltage level of the pixel.

However, amplifiers used to amplify this difference generally include an offset voltage due to imbalances of the transistors, resistors, and other internal elements of the amplifier. This offset is difficult to predict and may change over process, temperature, and voltage variations. Furthermore, the offset may be amplified along with the intended signal, creating an even larger and unknown amount of offset on the amplified output signal.

Consequently, circuits and methods have been proposed for canceling this offset voltage so that the amplified output signal includes only amplification of the input signal and not the offset voltage. However, in image sensors, a single amplifier may be used for a large number of pixel columns to amplify the value from each pixel column in sequence. This large array of pixel columns may impose a large load on the input terminals of an amplifier. This large load may cause difficulties in using conventional offset cancellation techniques.

Therefore, there is a need for devices and methods for amplifier offset cancellation that can operate effectively with potentially large loads on the input signals, which may be attributable to an array of pixel columns coupled in parallel.

BRIEF DESCRIPTION OF THE DRAWINGS

In the drawings, which illustrate embodiments for carrying out the invention.

DETAILED DESCRIPTION OF THE INVENTION

Embodiments of the present invention comprise methods, devices, and systems configured for offset cancellation in an amplifier that may be exposed to large loads on the inputs due to, for example, an array of pixel columns coupled in parallel.

A representative embodiment of the present invention includes a method of sensing pixel columns. The method includes amplifying a first amplifier input to a first output and a second amplifier input to a second output. During another time period the method includes canceling an amplifier offset by selectively coupling the first output to the first amplifier input and selectively coupling the second output to the second amplifier input. During at least a portion of the time when the canceling occurs, the method includes selectively buffering the first amplifier input to a first pixel signal. During a different portion of the time when the canceling occurs, the method includes selectively buffering the second amplifier input to a second pixel signal. Finally, during at least another portion of the time when the amplifying occurs, the method includes selectively coupling the first pixel signal to the first amplifier input and the second pixel signal to the second amplifier input.

Another representative embodiment of a method of sensing pixel columns includes, generating amplified outputs from amplifier inputs during a gain phase. During a first canceling phase, the method includes canceling an amplifier offset and buffering a first amplifier input of the amplifier inputs to a first pixel signal. During a second canceling phase, the method includes canceling the amplifier offset and buffering a second amplifier input of the amplifier inputs to a second pixel signal. Finally, the method includes coupling the first pixel signal to the first amplifier input and the second pixel signal to the second amplifier input during the gain phase.

Another representative embodiment of the present invention comprises a pixel column sensor including a first pixel signal, a second pixel signal, an offset canceling amplifier, a buffer element, a buffer selector, and a sense selector. The offset canceling amplifier has a first amplifier input, a second amplifier input, a first output, and a second output and is configured for canceling an amplifier offset by coupling the first output to the first amplifier input and coupling the second output to the second amplifier input when a amplifier reset signal is asserted and amplifying the first amplifier input and the second amplifier input when a gain select signal is asserted. The buffer selector is configured for selectively coupling the first amplifier input to a buffer input of the buffer element and selectively coupling a buffer output of the buffer element to the first pixel signal when a pixel-reset select signal is asserted. The buffer selector is also configured for selectively coupling the second amplifier input to the buffer input and selectively coupling the buffer output to the second pixel signal when a pixel-sense select signal is asserted. Finally, the sense selector is configured for selectively coupling the first pixel signal to the first amplifier input and the second pixel signal to the second amplifier input when the gain select signal is asserted. This embodiment of the pixel column sensor may be used in a semiconductor imager including a sensor array comprising a plurality of pixels arranged in a plurality of rows and a plurality of columns, a row decoder operably coupled to the sensor array and configured for selecting each row of the plurality of rows, and a column decoder including the pixel column sensor and operably coupled to the sensor array and configured for receiving in parallel, at least one signal from each pixel of a selected row. This embodiment of the semiconductor imager may be used in an imaging system wherein the semiconductor imager is coupled to a processor.

Yet another representative embodiment, in accordance with the present invention, comprises a pixel column sensor comprising a first pixel signal, a second pixel signal, and a differential amplifier having a first amplifier input, a second amplifier input, a first output, and a second output. A first feedback circuit operably couples the first output and the first amplifier input and a second feedback circuit operably couples the second output and the second amplifier input. Each of the first and second feedback circuits includes a reset path configured to couple a feedback circuit input to a feedback circuit output and a gain path configured to couple at least one feedback capacitor between the feedback circuit input and the feedback circuit output. The pixel column sensor also includes a buffer element including a buffer input and a buffer output. A set of buffer switches selectively couples the buffer element between the amplifier inputs and the pixel signals. A first buffer switch selectively couples the first amplifier input to the buffer input, a second buffer switch selectively couples the second amplifier input to the buffer input, a third buffer switch selectively couples the buffer output to the first pixel signal, and a fourth buffer switch selectively couples the buffer output to the second pixel signal. Finally, a sense selector is configured for selectively coupling the first pixel signal to the first amplifier input and the second pixel signal to the second amplifier input. This embodiment of the pixel column sensor may be used in a semiconductor imager including a sensor array comprising a plurality of pixels arranged in a plurality of rows and a plurality of columns, a row decoder operably coupled to the sensor array and configured for selecting each row of the plurality of rows, and a column decoder including the pixel column sensor and operably coupled to the sensor array and configured for receiving in parallel, at least one signal from each pixel of a selected row. This embodiment of the semiconductor imager may be used in an imaging system wherein the semiconductor imager is coupled to a processor.

The following provides a more detailed description of the present invention and various representative embodiments thereof. In this description, circuits and functions may be shown in block diagram form in order not to obscure the present invention in unnecessary detail. Conversely, specific circuit implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal. Furthermore, the terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

Figure 1:
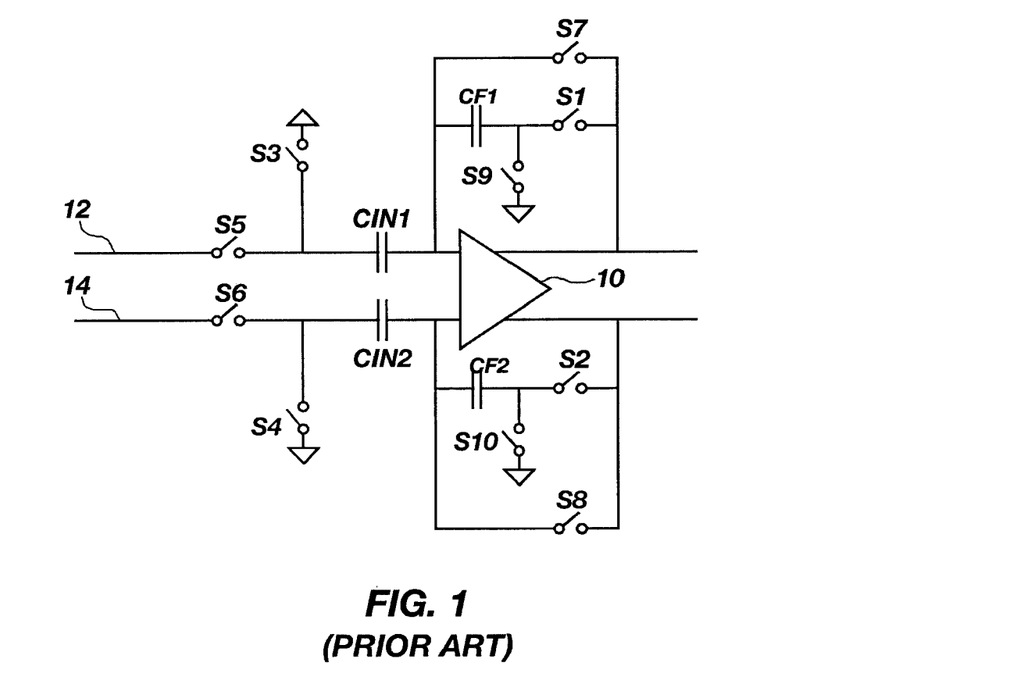
FIG. 1 is a circuit diagram of a conventional offset cancellation circuit for a differential amplifier.

First, FIG. 1 illustrates a circuit diagram of a conventional offset cancellation circuit for a differential amplifier 10. Feedback switches (S1 and S2) and feedback capacitors (CF1 and CF2) are coupled in series between the amplifier outputs and the amplifier inputs. Similarly, reset switches (S7 and S8) are coupled between the amplifier outputs and the amplifier inputs. Reset switches (S9 and S10) selectively couple one side of the feedback capacitors (CF1 and CF2) to ground. Sampling capacitors (CIN1 and CIN2) also are coupled to the amplifier inputs. On the other side of the sampling capacitors (CIN1 and CIN2), reset switches (S3 and S4) are coupled between the sampling capacitors (CIN1 and CIN2) and ground, or another suitable reference signal. Input switches (S5 and S6) couple input signals (12 and 14), to sampling capacitors CIN1 and CIN2, respectively.

In operation, during an offset cancellation phase, reset switches (S3, S4, and S7-S10) are closed, input switches S5 and S6 are open, and feed back switches (S1 and S2) are open. This places one side of the sampling capacitors CIN1 and CIN2 at ground and the other side of sampling capacitors CIN1 and CIN2 at the potential of the differential amplifier 10 inputs. In addition, with reset switches (S7-S10) closed the feedback capacitors (CF1 and CF2) are precharged to the offset voltage from the differential amplifier 10, which is represented as the difference in voltage between the two input terminals of the differential amplifier 10. During a gain phase, reset switches (S3, S4, and S7-S10) are open, input switches S5 and S6 are closed, and feedback switches S1 and S2 are closed. As a result, the precharged voltages on feedback capacitors CF1 and CF2 are subtracted from the output offset during the gain phase.

In conventional image sensor implementations, many sampling capacitors (CIN1 and CIN2) may be connected in parallel. As a result, it may be difficult, or impractical for the differential amplifier 10 to drive the large capacitive load during the offset cancellation phase. In these implementations, a separate reference voltage driver (not shown) may be used to provide a clamp voltage capable of driving the large capacitive load. However, in these implementation the clamp voltage is not related to the offset voltage of the amplifier so there is no way to cancel the offset voltage.

The present invention, in a number of representative embodiments described herein, may be used in a number of applications including CMOS image sensors and may be configured to drive large loads onto signal sampling lines and still provide for overall offset cancellation to remove any amplifier offset prior to amplification so that the offset is not amplified.

Figure 2:
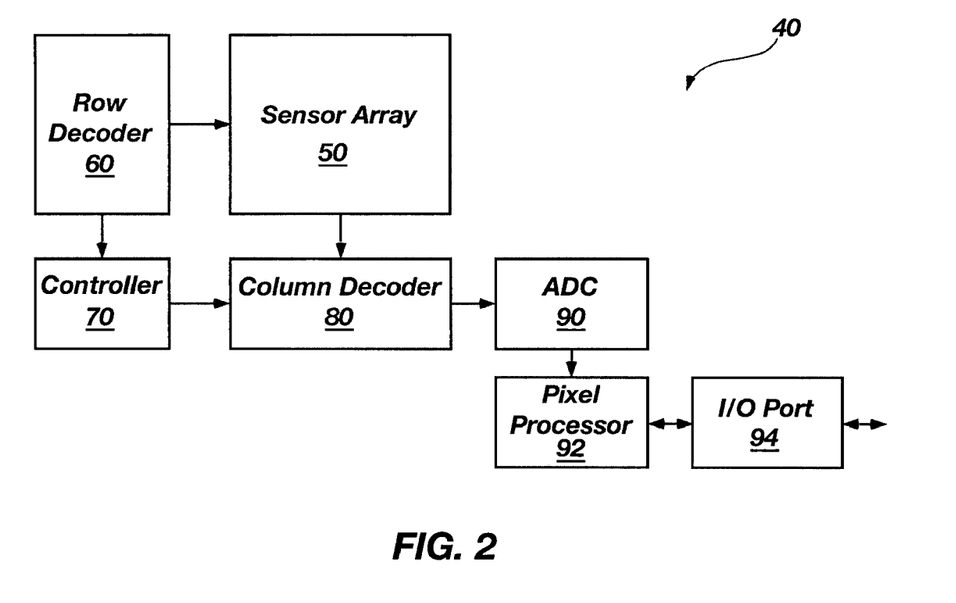
FIG. 2 is a simplified block diagram of a CMOS image sensor in accordance with a representative embodiment of the invention.

FIG. 2 is a simplified block diagram of a semiconductor imager 40 in accordance with a representative embodiment of the invention. The imager includes a sensor array 50, a row decoder 60, a column decoder 80, and a controller 70. The sensor array 50 (which may also be referred to as an array of pixels) includes photo-sensitive devices such as photodiodes or photo-transistors fabricated on, for example, a complementary metal oxide semiconductor (CMOS) device. Each photo-sensitive device is sensitive to light in such a way that it can create an electrical charge that is proportional to the intensity of light striking the photo-sensitive device. The overall image captured by a sensor array 50 includes many pixels arranged in an array such that each pixel detects the light intensity at the location of that pixel.

As stated earlier, a single pixel may include a single photo-sensitive device configured for detecting a broad frequency range, which may be used for gray scale images. In addition, a pixel may be defined as a single photo-sensitive device configured for detecting a specific color (i.e., frequency). Finally, a pixel may be a group of photo-sensitive devices arranged near each other wherein different devices within the group are configured for detecting different colors. Thus, a full color image may be detected with an appropriate combination of color sensing pixels. The term pixel as used herein may refer to a single photo-sensitive device for detecting a broad range of frequencies, a single photo-sensitive device for detecting a narrow frequency band, or a combination of photo-sensitive devices configured to capture a color image at the location of the pixel. The pixels of the sensor array 50 are arranged in individually addressable rows and columns such that the row decoder 60 can address each row of the sensor array 50 and the column decoder 80 can address each column of the sensor array 50. While not illustrated with connections, it will be understood by those of ordinary skill in the art that the controller 70 may control functions of many or all of the other blocks within the image sensor. For example, the controller 70 may control the exposure of the sensor array 50 (i.e., capturing an image) and the sequencing of the row decoder 60 and column decoder 80 to read out the analog values at each pixel location within the sensor array 50.

While not limited to a certain sequence, generally, the row decoder 60 selects a specific row and the column decoder 80 then receives every pixel in the selected row in parallel. The column decoder 80 can then sequence through each pixel within the selected row to determine the charge on each pixel.

As the pixels are each individually addressed, the resulting analog signal from each pixel may be sequentially directed from the column decoder 80 to an analog to digital converter 90. The analog to digital converter 90 converts the analog signal for each pixel to a digital signal representing the intensity of light at that pixel.

The digital signal for each pixel may be directed through a pixel processor 92. The pixel processor 92 may perform a number of functions on the pixel being processed. By way of example, and not limitation, if a pixel is identified as including an anomaly or defect, the value for the pixel may be replaced with a new value. For example, the value may be replaced by the value of a neighboring pixel or an average value from a number of neighboring pixels. In addition, other signal processing functions, such as, for example, filtering and compression may be performed by the pixel processor 92.

After processing, the current pixel may be transferred to an input/output (I/O) port for transmission out of the semiconductor imager 40. The I/O port 94 may include storage to save up values from a number of pixels such that pixel values may be transferred out of the semiconductor imager 40 in a parallel or serial fashion.

Figure 3:
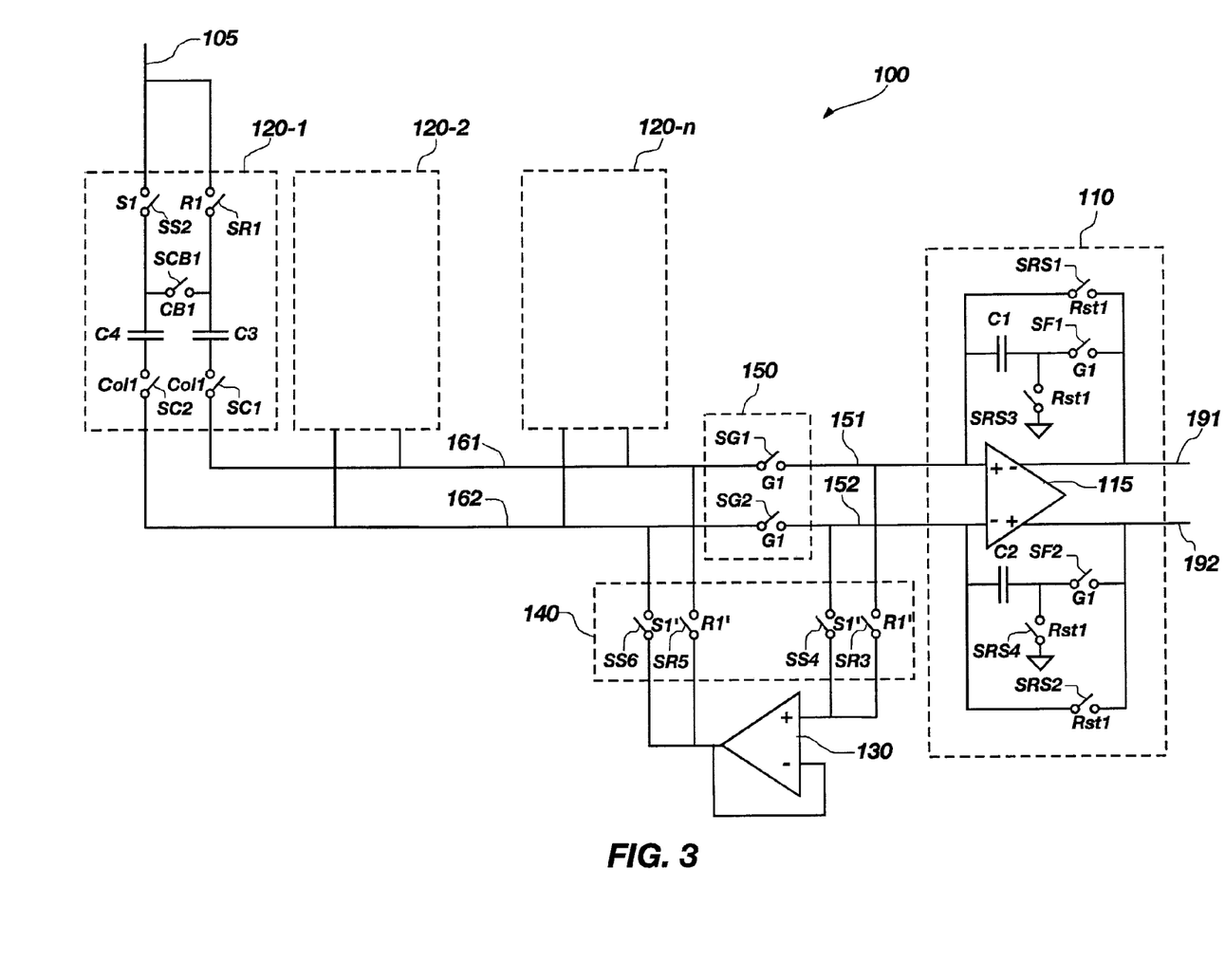
FIG. 3 is a circuit diagram of a pixel column amplifier in accordance with a representative embodiment of the invention.

FIG. 3 is a circuit diagram of a pixel column amplifier 100, which is included within the column decoder 80, in accordance with a representative embodiment of the invention. Each pixel column couples to a pixel sensor (120-1, 120-2, 120-n). A column input 105, coupled to each pixel within the specific column feeds the pixel sensor 120. Generally, a pixel provides at least two signals to the pixel sensor 120. A reset signal includes a charge in the pixel corresponding to a reset state of the pixel and a sense signal corresponding to a charge in a pixel after exposure to an image. In FIG. 3, these signals are multiplexed onto the single column input 105. However, while not shown, the present invention includes embodiments wherein the reset signal and sense signal may be separate physical signals to the pixel sensor 120 as will be apparent from the following description.

Each pixel sensor 120 includes reset switch SR1 (which may also be referred to as a first pixel switch) and a sense switch SS2 (may also be referred to as a second pixel switch). The reset switch SR1 is used for selectively coupling the reset signal onto a reset capacitor C3 (which may also be referred to as a first storage element) and the sense switch SS2 is used for selectively coupling the sense signal onto a sense capacitor C4 (may also be referred to as a second storage element). A crowbar switch SCB1 is coupled between the reset capacitor C3 and the sense capacitor C4 on the pixel column side of the pixel sensor 120. On the other side of the storage elements (i.e., the bus side), a first column switch SC1 selectively couples the reset capacitor C3 onto a first pixel signal 161 and a second column switch SC2 selectively couples the sense capacitor C4 onto a second pixel signal 162. The first column switch SC1 and second column switch SC2 may be referred to collectively as a column selector.

An offset canceling amplifier 110 is also part of the pixel column amplifier 100. The offset canceling amplifier 110 includes a differential amplifier 115 with a first amplifier input 151, a second amplifier input 152, a first output 191, and a second output 192. A first feedback circuit couples the first output 191 back to the first amplifier input 151 and a second feedback circuit couples the second output 192 back to the second amplifier input 152.

Each feedback circuit is similar and includes a first amplifier reset switch (SRS1 and SRS2) and a second amplifier reset switch (SRS3 and SRS4), a feedback capacitor (C1 and C2), and a feedback switch (SF1 and SF2).

The pixel column amplifier 100 also includes a buffer element 130 and a buffer selector 140. The buffer element 130 provides the current required to drive the large load that may be present on the first pixel signal 161 and the second pixel signal 162 during various phases of operation as is explained more fully below. As illustrated in FIG. 3, the buffer element may be configured as an opamp in a unity-gain configuration with the output coupled to an inverting input and the non-inverting input of the opamp acting as the input of the buffer element.

The buffer selector 140 includes a first buffer switch SR3 for selectively coupling the first amplifier input 151 to the buffer input and a second buffer switch SS4 for selectively coupling the second amplifier input 152 to the buffer input.

Similarly, the buffer output is selectively coupled to the first pixel signal 161 by a third buffer switch SR5 and selectively coupled to the second pixel signal 162 by a fourth buffer switch SS6.

Finally, the pixel column amplifier 100 includes a first input switch SG1 for selectively coupling the first pixel signal 161 to the first amplifier input 151 and a second input switch SG2 for selectively coupling the second pixel signal 162 to the second amplifier input 152. The first input switch SG1 and second input switch SG2 may be referred to collectively as a sense selector 150.

The various switches are controlled by different signals that become active at different times during the column sensing process. These signals are: an amplifier reset signal Rst1, a gain select signal G1, a pixel-reset select signal R1, a pixel-sense select signal S1, a crowbar select signal CB1, and a column select signal Col1. Note that there is actually a separate column select signal (Col1, Col2, and Coln) for each column within the pixel array.

Figure 4:
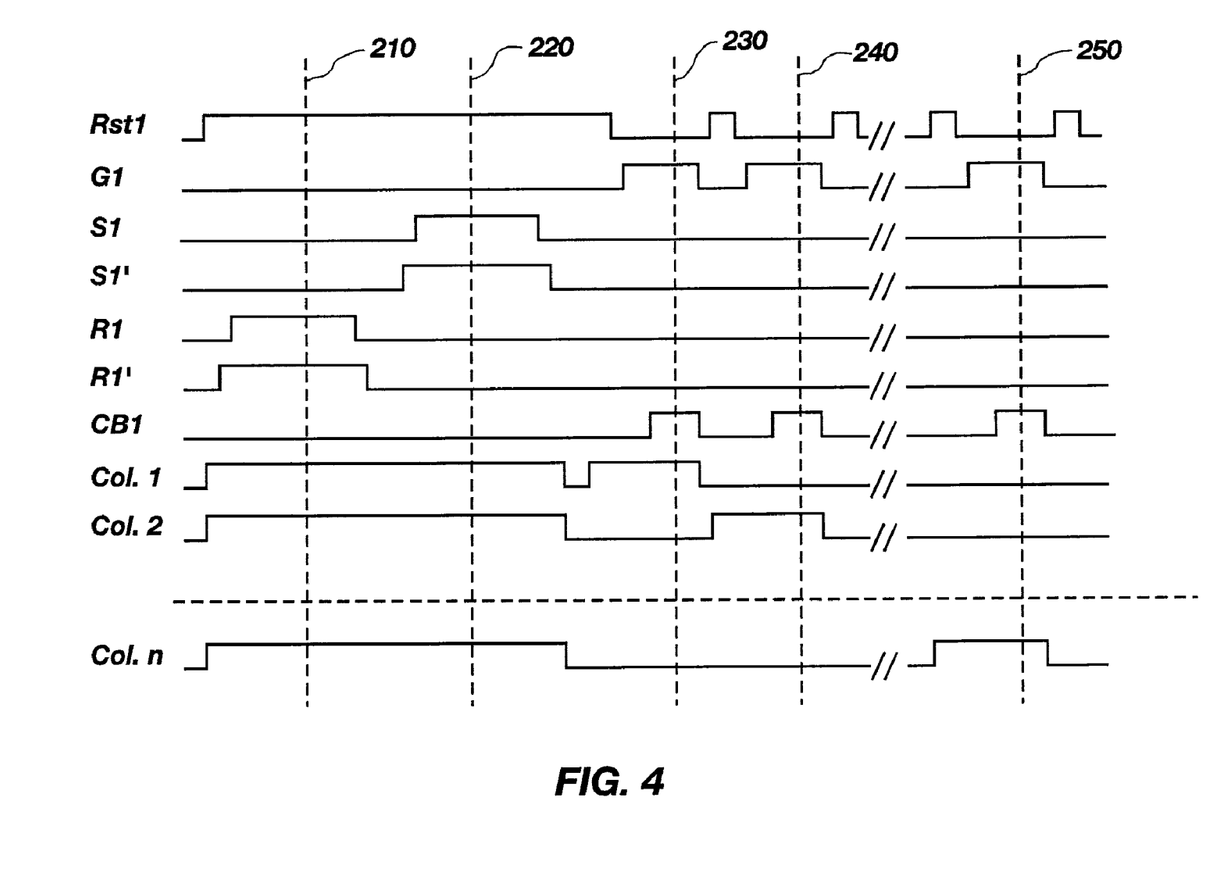
FIG. 4 illustrates a representative timing diagram that may be used in practicing the representative embodiment of FIG. 3.
Figure 5:
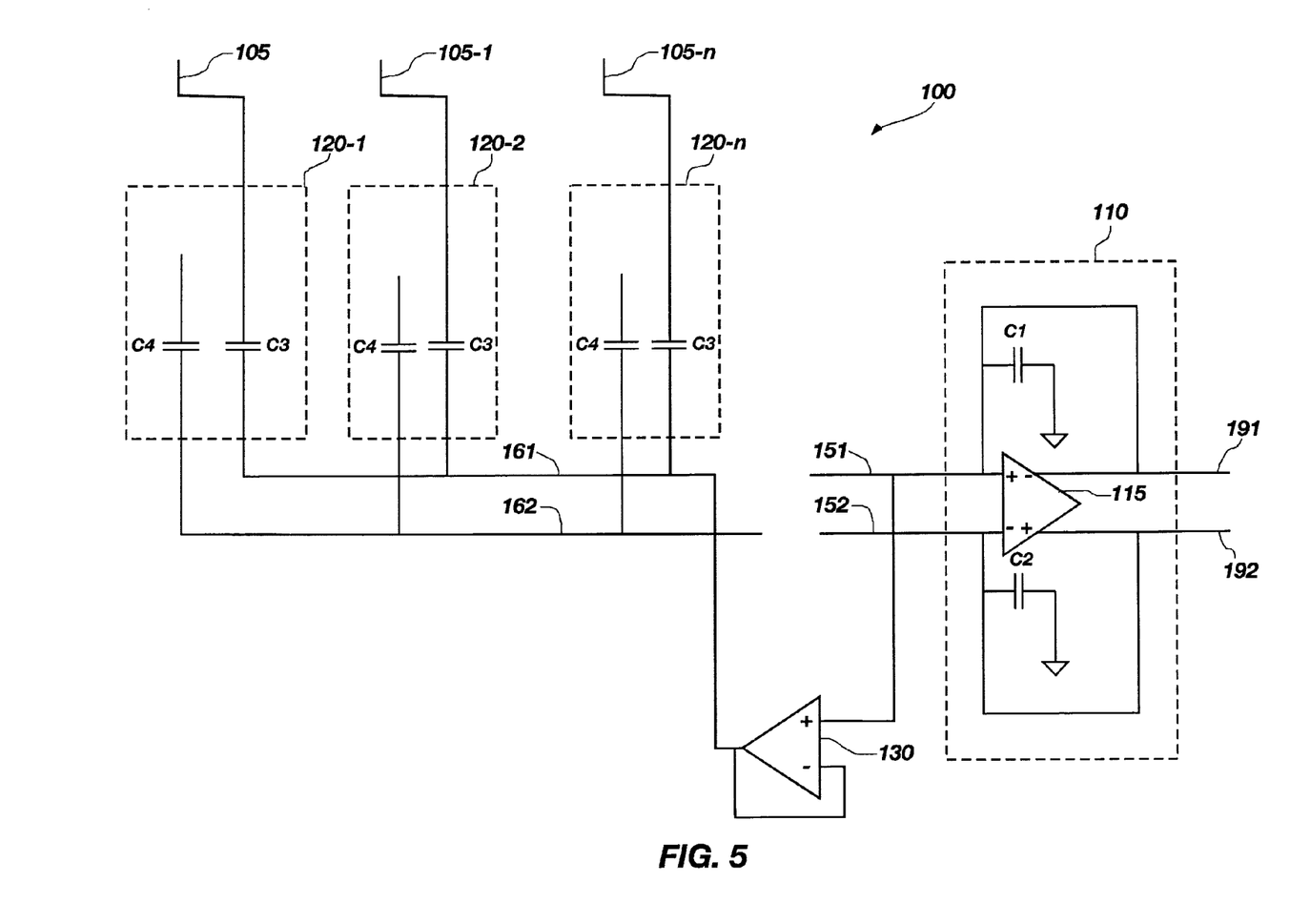
FIG. 5 is a partial circuit diagram of the pixel column amplifier of FIG. 3, illustrating circuitry pertinent to a pixel reset phase.
Figure 6:
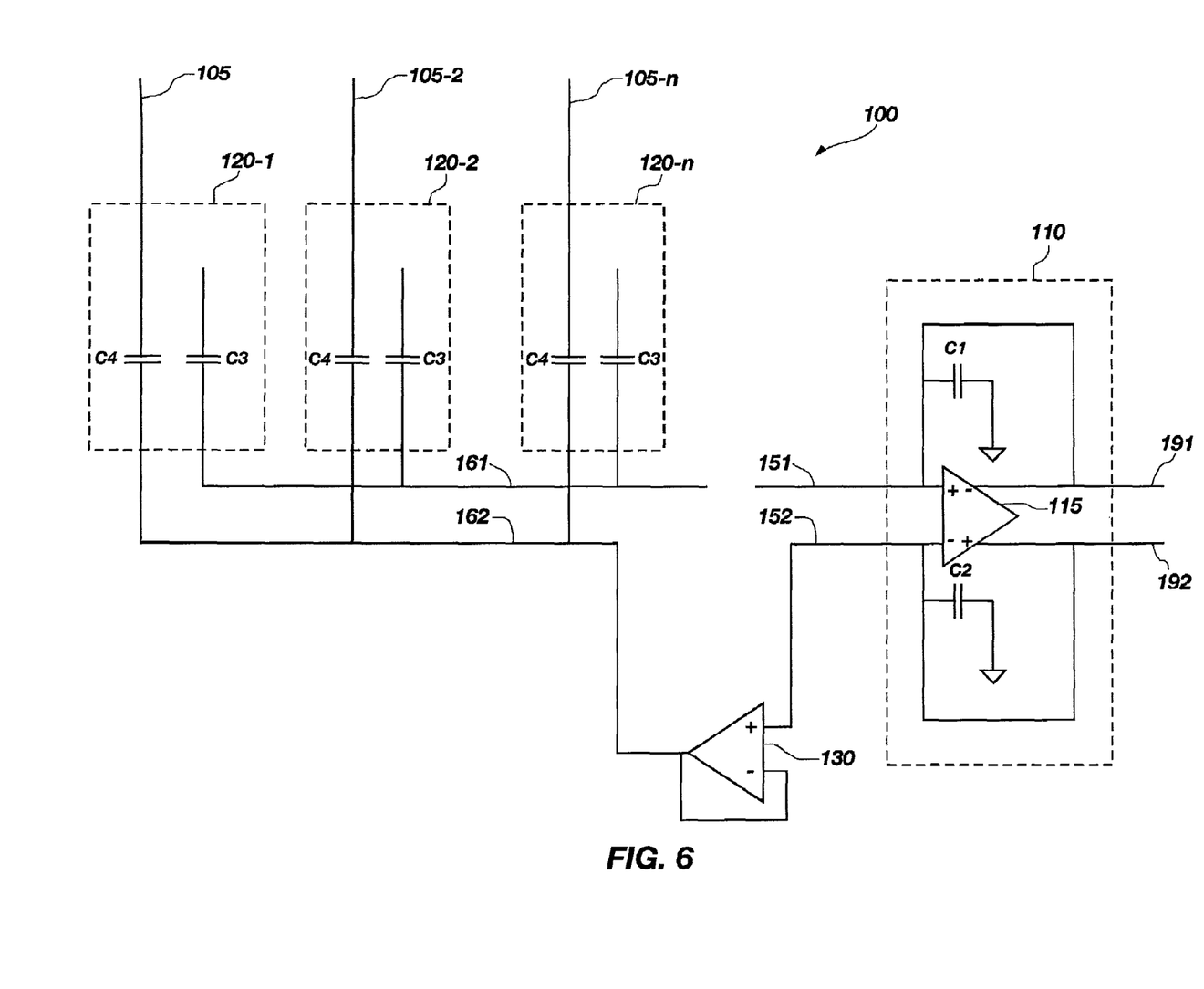
FIG. 6 is a partial circuit diagram of the pixel column amplifier of FIG. 3, illustrating circuitry pertinent to a pixel sensing phase.
Figure 7:
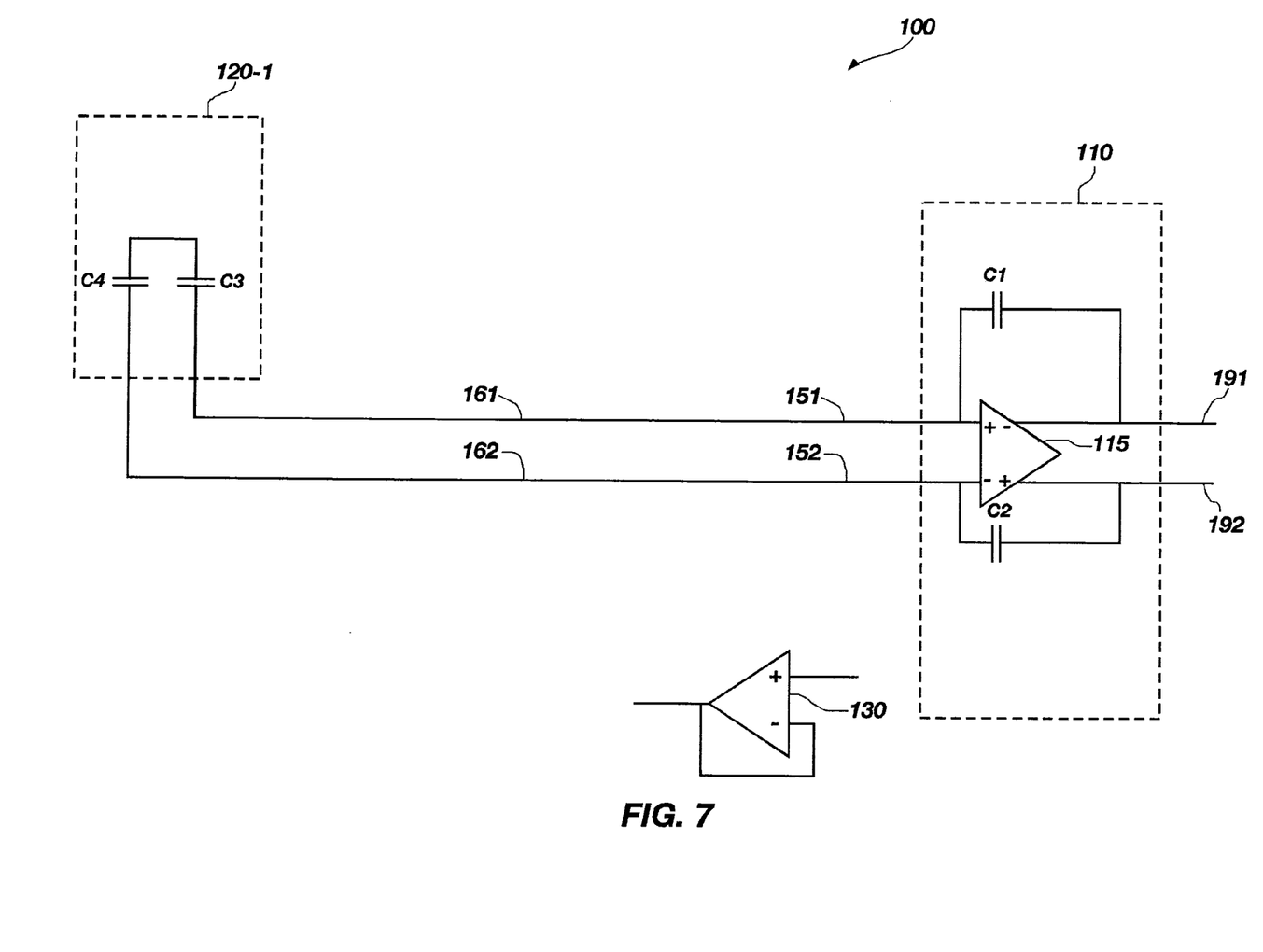
FIG. 7 is a partial circuit diagram of the pixel column amplifier of FIG. 3, illustrating circuitry pertinent to a gain phase of the amplifier.

Operation of the pixel column amplifier 100 will be discussed with reference to FIGS. 3-7. FIG. 4 illustrates a representative timing diagram that may be used in practicing the representative embodiment of FIG. 3. FIG. 5 is a partial circuit diagram of the pixel column amplifier 100 of FIG. 3, illustrating circuitry pertinent to a reset phase 210. FIG. 6 is a partial circuit diagram of the pixel column amplifier 100 of FIG. 3, illustrating circuitry pertinent to a sensing phase. Finally, FIG. 7 is a partial circuit diagram of the pixel column amplifier 100 of FIG. 3, illustrating circuitry pertinent to a gain phase 230.

At this point, it should be noted that the pixel-sense select signal S1 includes an additional pixel-sense select signal S1' for controlling switches to the buffer element 130. Similarly, the pixel-reset select signal R1 includes an additional pixel-reset select signal R1' for controlling switches to the buffer element 130. While not necessary, these additional select signals (S1' and R1') may be useful to ensure that the voltage related to the offset cancellation is stable at the input capacitors C3 and C4 during the reset phase and the sense phase. This can be seen from the timing diagram of FIG. 4, wherein the additional select signals (S1' and R1') follow the same patterns as their counterpart signals (S1 and R1, respectively), but transition before and after their counterpart signals (S1 and R1). Generally, when describing the sequence of events, the discussions herein do not differentiate between the additional select signals (S1' and R1') and their counterpart signals (S1 and R1).

With reference to FIGS. 3 and 4, the pixel column amplifier 100 may operate according to the sequence illustrated by the timing diagram of FIG. 4. At timing point 210, the amplifier reset signal Rst1, the column select signals (Col1, Col2, Coln), and the pixel-reset select signal R1 are active, while all the other switch control signals (S1, G1, and CB1) are inactive. This phase, which may be referred to as the reset phase 210 or a first canceling phase, is used for sampling the reset state of the pixels in the currently selected row and performing offset cancellation of the differential amplifier 115.

FIG. 5 is a partial circuit diagram of the pixel column amplifier 100 of FIG. 3, illustrating circuitry pertinent to the pixel reset phase 210. In FIG. 5, the closed switches are shown as a connection and the open switches are shown as an open circuit. Consequently, it is easy to see the offset canceling function on the amplifier wherein the amplifier outputs are fed back to the amplifier inputs 151 and 152 and one side of the feedback capacitors C1 and C2 is coupled to ground. This configuration leaves the amplifier offset as a difference in voltage between the first amplifier input 151 and the second amplifier input 152. In addition, the first amplifier input 151 is coupled to the input of the buffer element 130 and the output of the buffer element 130 is coupled to the first pixel signal 161. Furthermore, the column input 105 is coupled to a pixel terminal on one side of the reset capacitor C3 and the first pixel signal 161 is coupled to a bus terminal on the other side of the reset capacitor C3. From this diagram, it is easy to see that the reset capacitors C3 from each column are coupled in parallel, which represents a relatively large load that may not be able to be driven adequately by the differential amplifier 115. However, the buffer element 130 can present the same voltage level as is present on the amplifier input plus its offset and adequately drive the large load. At the end of the reset phase 210, the reset capacitor C3 holds a voltage approximately equal to the pixel reset voltage on the column input 105 minus the offset cancellation voltage on the first amplifier input 151 and minus the offset of the buffer element 130. (i.e., Vr=Vpixel_reset−Vampoffset1−Vbufferoffset).

With reference to FIGS. 3 and 4, at timing point 220, the amplifier reset signal Rst1, the column select signal (Col1, Col2, Coln), and the sense select signal S1 are active, while all the other switch control signals (R1, G1, and CB1) are inactive. This phase, which may be referred to as the sense phase 220 or a second canceling phase, is used for sampling the sense state (i.e., the state of the pixel after exposure to an image) of the pixels in the currently selected row and performing offset cancellation of the differential amplifier 115.

FIG. 6 is a partial circuit diagram of the pixel column amplifier 100 of FIG. 3, illustrating circuitry pertinent to the pixel sense phase 220. In FIG. 6, the closed switches are shown as a connection and the open switches are shown as an open circuit. Consequently, it is easy to see the offset canceling function on the amplifier wherein the amplifier outputs are fed back to the amplifier inputs 151 and 152 and one side of the feedback capacitors C1 and C2 is coupled to ground. This leaves the amplifier offset as a difference in voltage between the first amplifier input 151 and the second amplifier input 152. In addition, the second amplifier input 152 is coupled to the input of the buffer element 130 and the output of the buffer element 130 is coupled to the second pixel signal 162. Furthermore, the column input 105 is coupled to a pixel terminal on one side of the sense capacitor C4 and the second pixel signal 162 is coupled to a bus terminal on the other side of the sense capacitor C4. From this diagram, it is easy to see that the sense capacitors C4 from each column are coupled in parallel, which represents a relatively large load that may not be able to be driven adequately by the differential amplifier 115. However, the buffer element 130 can present the same voltage level as is present on the amplifier input plus its offset and adequately drive the large load. At the end of the sense phase 220, the sense capacitor C4 holds a voltage approximately equal to the pixel sense voltage on the column input 105 minus the offset cancellation voltage on the second amplifier input 152 and minus the offset of the buffer element 130. (i.e., Vs=Vpixel_sense−Vampoffset2−Vbufferoffset).

With reference to FIGS. 3 and 4, at timing point 230, the column select signal Col1 is active, column select signals (Col2, Coln) are inactive, the gain select signal G1 is active, the crowbar select signal CB1 is active, while all the other switch control signals (R1, S1, and Rst1) are inactive. This phase, which may be referred to as the gain phase 230, is used for amplifying the difference between the voltage on the column input 105 during the sense state and the reset state, while removing the differential amplifier offset and the buffer element offset.

FIG. 7 is a partial circuit diagram of the pixel column amplifier 100 of FIG. 3, illustrating circuitry pertinent to the gain phase 230 for the first column. In FIG. 7, the closed switches are shown as a connection and the open switches are shown as an open circuit. Consequently, the input capacitors C3 and C4 are coupled in series and coupled to the amplifier inputs 151 and 152. In addition, the buffer element 130 is isolated from the rest of the circuit. Finally, the feedback capacitors C1 and C2 are coupled between the amplifier outputs and the amplifier inputs 151 and 152 such that the gain is defined as the ratio of the feedback capacitors C1 and C2 relative to the input capacitors C3 and C4. Of course, a wide variety of ratios (including a unity gain) may be selected within the scope of the invention, depending on circuit characteristics and the amplification desired.

With the configuration shown in FIG. 7 during the gain phase 230, the voltage that will be amplified is the difference between the reset voltage Vr and the sense voltage Vs. It should be noted that the buffer element 130 is not free from offset. However, the buffer element's offset is added equally to both input capacitors C3 and C4 during the pixel reset and pixel sense phases, respectively. Consequently, the amplified signal represents only the difference in voltage sensed on the column input 105 during the sense phase 220 relative to the voltage sensed on the column input 105 during the reset phase 210. In other words, the offset from the differential amplifier 150 and the offset from the buffer element 130 have been effectively canceled and only the desired signals are amplified.

With reference to the timing diagram of FIG. 4, the timing points illustrated by lines 240 and 250 are the gain phases 230 for the second column and the $n^{th}$ column. In other words, after the sense phase 220 and reset phase 210, each pixel sensor 120 holds the proper state for the pixel in that column and the currently selected row. Thus, the process can sequentially step through a gain phase 230 for each column to determine and amplify the signal difference between the sense phase 220 and the reset phase 210.

It will be readily apparent to those of ordinary skill in the art that the switches described herein may be formed in a number of ways on a semiconductor device. By way of example, and not limitation, the switches may be formed as NMOS pass gates, PMOS pass gates, or CMOS pass gates.

Figure 8:
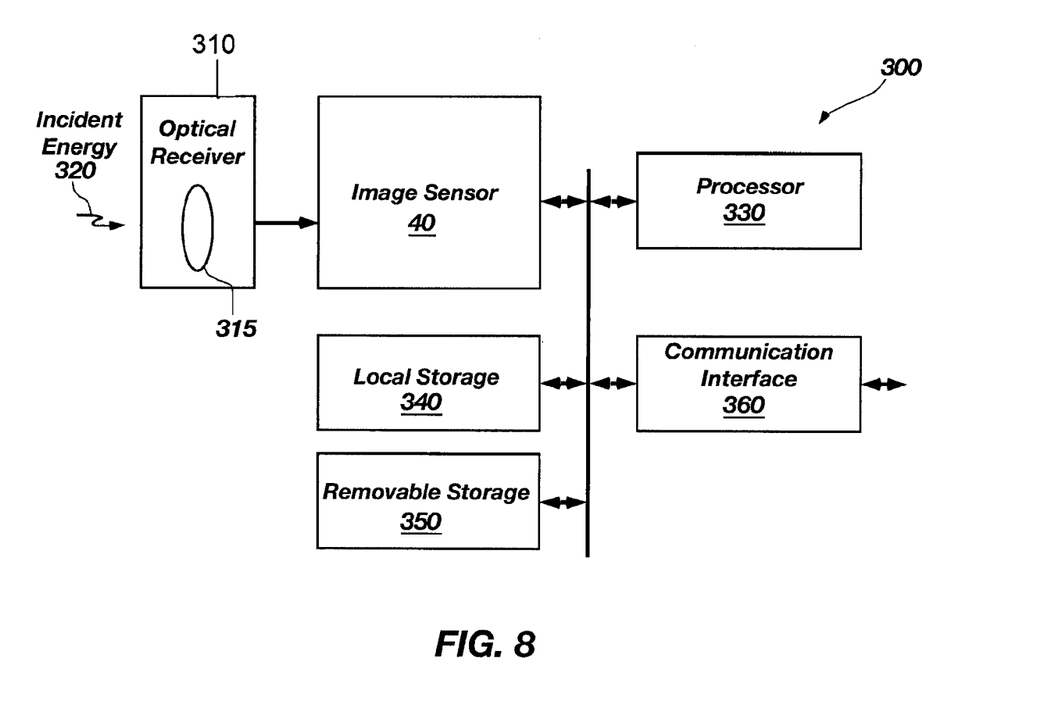
FIG. 8 is an imaging system diagram including an image sensor containing a pixel column amplifier according to the present invention.

FIG. 8 illustrates an imaging system 300 including an semiconductor imager 40 containing a pixel column amplifier (not shown) according to the present invention. The imaging system 300 includes a processor 330 for receiving and modifying digital representations of images from the semiconductor imager 40. The imaging system 300 may also include an optical receiver 310 for channeling, focusing, or modifying incident energy 320, being visible light in one case, to present an optical image to the image sensor. For example, the optical receiver 310 may include a lens 315 for focusing the incident energy 320 onto the semiconductor imager 40.

The imaging system 300 may include a communication interface 360 for transmitting and receiving data. Finally, the imaging system 300 may include memory (340 and 350) in the form of local storage 340 and removable storage 350, such as, for example, Flash memory, magnetic recording media and optical recording media.

Without being limiting, such an imaging system 300 may include a computer system, camera system, scanner, machine vision, videophone, surveillance system, auto focus system, image stabilization system, and data compression system.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method of sensing pixel columns, comprising:
   amplifying a first amplifier input to a first output and a second amplifier input to a second output;
   canceling an amplifier offset by selectively coupling the first output to the first amplifier input and selectively coupling the second output to the second amplifier input;
   with a buffer amplifier having a buffer amplifier input and having a buffer amplifier output, selectively coupling the first amplifier input to a first pixel signal at least a portion of the time when the canceling occurs by coupling the buffer amplifier input to the first amplifier input and the buffer amplifier output to the first pixel signal;
   with the buffer amplifier, selectively coupling the second amplifier input to a second pixel signal at least another portion of the time when the canceling occurs by coupling the buffer amplifier input to the second amplifier input and the buffer amplifier output to the second pixel signal; and
   selectively coupling the first pixel signal to the first amplifier input and the second pixel signal to the second amplifier input at least a portion of the time when the amplifying occurs.

2. The method of claim 1, further comprising sensing a plurality of pixel columns wherein each pixel column is sensed by the acts of:
   selectively coupling a column input to one side of a first storage element and the first pixel signal to another side of the first storage element at least a portion of the time when selectively coupling the first amplifier input;
   selectively coupling the column input to one side of a second storage element and the second pixel signal to another side of the second storage element at least a portion of the time when selectively coupling the second amplifier input; and
   selectively coupling the first storage element to the second storage element, the first pixel signal to the other side of the first storage element, and the second pixel signal to the other side of the second storage element at least a portion of the time when the amplifying occurs.

3. The method of claim 1, wherein amplifying comprises coupling a first feedback capacitor between the first amplifier input and the first output and coupling a second feedback capacitor between the second amplifier input and the second output.

4. A method of sensing pixel columns, comprising:
   generating amplified outputs from amplifier inputs during a gain phase;
   with a buffer amplifier having a buffer amplifier input and having a buffer amplifier output, coupling a first amplifier input of the amplifier inputs to a first pixel signal during a first amplifier offset canceling phase by coupling the buffer amplifier input to the first amplifier input and the buffer amplifier output to the first pixel signal;
   with the buffer amplifier, coupling a second amplifier input of the amplifier inputs to a second pixel signal during a second amplifier offset canceling phase by coupling the buffer amplifier input to the second amplifier input and the buffer amplifier output to the second pixel signal; and
   coupling the first pixel signal to the first amplifier input and the second pixel signal to the second amplifier input during the gain phase.

5. The method of claim 4, further comprising sensing a plurality of pixel columns wherein each pixel column is sensed by the acts of:
- coupling a first storage element between a column input and the first pixel signal during the first amplifier offset canceling phase;
- coupling a second storage element between the column input and the first pixel signal during the second amplifier offset canceling phase; and
- coupling the first storage element and the second storage element in series and between the first pixel signal and the second pixel signal during the gain phase.

6. The method of claim 4, wherein generating amplified outputs comprises coupling a first feedback capacitor between the first amplifier input and a first output of the amplified outputs and coupling a second feedback capacitor between the second amplifier input and a second output of the amplified outputs.

7. The method of claim 4, wherein the first amplifier offset canceling phase comprises coupling the first amplifier input to a first output of the amplified outputs.

8. The method of claim 4, wherein the second amplifier offset canceling phase comprises coupling the second amplifier input to a second output of the amplified outputs.

9. A pixel column sensor, comprising:
- a first pixel signal;
- a second pixel signal;
- an offset canceling amplifier having a first amplifier input, a second amplifier input, a first output, and a second output wherein the offset canceling amplifier is configured for:
  - canceling an amplifier offset by coupling the first output to the first amplifier input and coupling the second output to the second amplifier input when a amplifier reset signal is asserted; and
  - amplifying the first amplifier input and the second amplifier input when a gain select signal is asserted;
- a buffer element including a buffer input and a buffer output;
- a buffer selector configured for:
  - selectively coupling the first amplifier input to the buffer input and the buffer output to the first pixel signal when a pixel-reset select signal is asserted; and
  - selectively coupling the second amplifier input to the buffer input and the buffer output to the second pixel signal when a pixel-sense select signal is asserted; and
- a sense selector configured for selectively coupling the first pixel signal to the first amplifier input and the second pixel signal to the second amplifier input when the gain select signal is asserted.

10. The pixel column sensor of claim 9, further comprising a plurality of pixel sensors, each pixel sensor of the plurality including:
- a first storage element having a first terminal and a second terminal and configured for selectively coupling the first terminal to a column input when the pixel-reset select signal is asserted and selectively coupling the second terminal to the first pixel signal when a column select signal is asserted;
- a second storage element having a first terminal and a second terminal and configured for selectively coupling the first terminal to the column input when the pixel-sense select signal is asserted and selectively coupling the second terminal to the second pixel signal when the column select signal is asserted; and
- a crowbar switch configured for selectively coupling the first terminal of the first storage element to the first terminal of the second storage element when a crowbar select signal is asserted.

11. The pixel column sensor of claim 9, wherein the buffer selector comprises:
- a first buffer switch coupled between the first amplifier input and the buffer input and controlled by the pixel-reset select signal;
- a second buffer switch coupled between the second amplifier input and the buffer input and controlled by the pixel-sense select signal;
- a third buffer switch coupled between the buffer output and the first pixel signal and controlled by the pixel-reset select signal; and
- a fourth buffer switch coupled between the buffer output and the first pixel signal and controlled by the pixel-reset select signal.

12. The pixel column sensor of claim 9, wherein the sense selector comprises:
- a first input switch operably coupled between the first pixel signal and the first amplifier input; and
- a second input switch operably coupled between the second pixel signal and the second amplifier input.

13. The pixel column sensor of claim 9, wherein the buffer element comprises an opamp with the buffer output operably coupled to an inverting input and an output of the opamp and wherein the buffer input operably couples to a non-inverting input of the opamp.

14. A pixel column sensor, comprising:
- a first pixel signal;
- a second pixel signal;
- a differential amplifier having a first amplifier input, a second amplifier input, a first output, and a second output;
- a first feedback circuit operably coupled between the first output and the first amplifier input and a second feedback circuit operably coupled between the second output and the second amplifier input, each of the first and second feedback circuits comprising:
  - a reset path configured to couple a feedback circuit input to a feedback circuit output; and
  - a gain path configured to couple at least one feedback capacitor between the feedback circuit input and the feedback circuit output;
- a buffer element including a buffer input and a buffer output;
- a first buffer switch configured for selectively coupling the first amplifier input to the buffer input;
- a second buffer switch configured for selectively coupling the second amplifier input to the buffer input;
- a third buffer switch configured for selectively coupling the buffer output to the first pixel signal;
- a fourth buffer switch configured for selectively coupling the buffer output to the second pixel signal; and
- a sense selector configured for selectively coupling the first pixel signal to the first amplifier input and the second pixel signal to the second amplifier input.

15. The pixel column sensor of claim 14, further comprising:
- a plurality of pixel sensors, each pixel sensor of the plurality including:
  - a first storage element having a pixel terminal and a bus terminal;
  - a second storage element having a pixel terminal and a bus terminal;

a first pixel switch configured for selectively coupling a column input to the pixel terminal of the first storage element;

a second pixel switch configured for selectively coupling the column input to the pixel terminal of the second storage element;

a crowbar switch configured for selectively coupling the pixel terminal of the first storage element to the pixel terminal of the second storage element; and a column selector configured for selectively coupling the bus terminal of the first storage element to the first pixel signal and selectively coupling the bus terminal of the second storage element to the second pixel signal.

16. The pixel column sensor of claim 14, wherein:

the reset path of each of the first and second feedback circuits comprises a canceling switch operably coupled between the feedback circuit input and the feedback circuit output; and the gain path of each of the first and second feedback circuits comprises:

at least one capacitive element;

a reset switch configured to selectively couple one side of the at least one capacitive element to a voltage reference; and a feedback switch configured to selectively couple the at least one capacative element between the feedback circuit input and the feedback circuit output.

17. The pixel column sensor of claim 14, wherein the sense selector comprises:

a first input switch operably coupled between the first pixel signal and the first amplifier input; and a second input switch operably coupled between the second pixel signal and the second amplifier input.

18. The pixel column sensor of claim 14, wherein the buffer element comprises an opamp configured with the buffer output operably coupled to an output and an inverting input of the opamp and the buffer input operably coupled to a non-inverting input of the opamp.

19. A semiconductor imager, comprising:

a sensor array comprising a plurality of pixels arranged in a plurality of rows and a plurality of columns;

a row decoder operably coupled to the sensor array and configured for selecting each row of the plurality of rows; and a column decoder operably coupled to the sensor array and configured for receiving in parallel, at least one signal from each pixel of a selected row, wherein the column decoder further comprises:

a first pixel signal;

a second pixel signal;

an offset canceling amplifier having a first amplifier input, a second amplifier input, a first output, and a second output wherein the offset canceling amplifier is configured for:

canceling an amplifier offset by coupling the first output to the first amplifier input and coupling the second output to the second amplifier input when a amplifier reset signal is asserted; and amplifying the first amplifier input and the second amplifier input when a gain select signal is asserted;

a buffer element including a buffer input and a buffer output;

a buffer selector configured for:

selectively coupling the first amplifier input to the buffer input and the buffer output to the first pixel signal when a pixel-reset select signal is asserted; and selectively coupling the second amplifier input to the buffer input and the buffer output to the second pixel signal when a pixel-sense select signal is asserted; and a sense selector configured for selectively coupling the first pixel signal to the first amplifier input and the second pixel signal to the second amplifier input when the gain select signal is asserted.

20. The semiconductor imager of claim 19, wherein the column decoder further comprises a plurality of pixel sensors, each pixel sensor of the plurality including:

a first storage element having a first terminal and a second terminal and configured for selectively coupling the first terminal to a column input when the pixel-reset select signal is asserted and selectively coupling the second terminal to the first pixel signal when a column select signal is asserted;

a second storage element having a first terminal and a second terminal and configured for selectively coupling the first terminal to the column input when the pixel-sense select signal is asserted and selectively coupling the second terminal to the second pixel signal when the column select signal is asserted; and a crowbar switch configured for selectively coupling the first terminal of the first storage element to the first terminal of the second storage element when a crowbar select signal is asserted.

21. An imaging system, comprising:

a processor; and a semiconductor imager operably coupled to the processor and comprising:

a sensor array comprising a plurality of pixels arranged in a plurality of rows and a plurality of columns;

a row decoder operably coupled to the sensor array and configured for selecting each row of the plurality of rows; and a column decoder operably coupled to the sensor array and configured for receiving in parallel, at least one signal from each pixel of a selected row, wherein the column decoder further comprises:

a first pixel signal;

a second pixel signal;

an offset canceling amplifier having a first amplifier input, a second amplifier input, a first output, and a second output wherein the offset canceling amplifier is configured for:

canceling an amplifier offset by coupling the first output to the first amplifier input and coupling the second output to the second amplifier input when an amplifier reset signal is asserted; and amplifying the first amplifier input and the second amplifier input when a gain select signal is asserted;

a buffer element including a buffer input and a buffer output;

a buffer selector configured for:

selectively coupling the first amplifier input to the buffer input and the buffer output to the first pixel signal when a pixel-reset select signal is asserted; and selectively coupling the second amplifier input to the buffer input and the buffer output to the second pixel signal when a pixel-sense select signal is asserted; and a sense selector configured for selectively coupling the first pixel signal to the first amplifier input and the second pixel signal to the second amplifier input when the gain select signal is asserted.

22. The imaging system of claim 21, wherein the column decoder further comprises a plurality of pixel sensors, each pixel sensor of the plurality including:

a first storage element having a first terminal and a second terminal and configured for selectively coupling the first terminal to a column input when the pixel-reset select signal is asserted and selectively coupling the second terminal to the first pixel signal when a column select signal is asserted;

a second storage element having a first terminal and a second terminal and configured for selectively coupling the first terminal to the column input when the pixel-sense select signal is asserted and selectively coupling the second terminal to the second pixel signal when the column select signal is asserted; and a crowbar switch configured for selectively coupling the first terminal of the first storage element to the first terminal of the second storage element when a crowbar select signal is asserted.

23. The imaging system of claim 21, further comprising an optical receiver configured to receive and modify incident light and present the modified light to the sensor array.

24. The imaging system of claim 21, further comprising:
a memory configured for storing a digital representation of an image captured by the sensor array; and
a communication interface configured for communicating the digital representation to an external device.

25. A semiconductor imager, comprising:
a sensor array comprising a plurality of pixels arranged in a plurality of rows and a plurality of columns;
a row decoder operably coupled to the sensor array and configured for selecting each row of the plurality of rows; and
a column decoder operably coupled to the sensor array and configured for receiving in parallel, at least one signal from each pixel of a selected row, wherein the column decoder further comprises:
a first pixel signal;
a second pixel signal;
a differential amplifier having a first amplifier input, a second amplifier input, a first output, and a second output;
a first feedback circuit operably coupled between the first output and the first amplifier input and a second feedback circuit operably coupled between the second output and the second amplifier input, each of the first and second feedback circuits comprising:
a reset path configured to couple a feedback circuit input to a feedback circuit output; and
a gain path configured to couple at least one feedback capacitor between the feedback circuit input and the feedback circuit output;
a buffer element including a buffer input and a buffer output;
a first buffer switch configured for selectively coupling the first amplifier input to the buffer input;
a second buffer switch configured for selectively coupling the second amplifier input to the buffer input;
a third buffer switch configured for selectively coupling the buffer output to the first pixel signal;
a fourth buffer switch configured for selectively coupling the buffer output to the second pixel signal; and
a sense selector configured for selectively coupling the first pixel signal to the first amplifier input and the second pixel signal to the second amplifier input.

26. The imaging system of claim 25, wherein the column decoder further comprises a plurality of pixel sensors, each pixel sensor of the plurality including:
a first storage element having a pixel terminal and a bus terminal;

a second storage element having a pixel terminal and a bus terminal;
a first pixel switch configured for selectively coupling a column input to the pixel terminal of the first storage element;
a second pixel switch configured for selectively coupling the column input to the pixel terminal of the second storage element;
a crowbar switch configured for selectively coupling the pixel terminal of the first storage element to the pixel terminal of the second storage element; and
a column selector configured for selectively coupling the bus terminal of the first storage element to the first pixel signal and selectively coupling the bus terminal of the second storage element to the second pixel signal.

27. An imaging system, comprising:
a processor; and
a semiconductor imager operably coupled to the processor and comprising:
a sensor array comprising a plurality of pixels arranged in a plurality of rows and a plurality of columns;
a row decoder operably coupled to the sensor array and configured for selecting each row of the plurality of rows; and
a column decoder operably coupled to the sensor array and configured for receiving in parallel, at least one signal from each pixel of a selected row, wherein the column decoder further comprises:
a first pixel signal;
a second pixel signal;
a differential amplifier having a first amplifier input, a second amplifier input, a first output, and a second output;
a first feedback circuit operably coupled between the first output and the first amplifier input and a second feedback circuit operably coupled between the second output and the second amplifier input, each of the first and second feedback circuits comprising:
a reset path configured to couple a feedback circuit input to a feedback circuit output; and
a gain path configured to couple at least one feedback capacitor between the feedback circuit input and the feedback circuit output;
a buffer element including a buffer input and a buffer output;
a first buffer switch configured for selectively coupling the first amplifier input to the buffer input;
a second buffer switch configured for selectively coupling the second amplifier input to the buffer input;
a third buffer switch configured for selectively coupling the buffer output to the first pixel signal;
a fourth buffer switch configured for selectively coupling the buffer output to the second pixel signal; and
a sense selector configured for selectively coupling the first pixel signal to the first amplifier input and the second pixel signal to the second amplifier input.

28. The imaging system of claim 27, wherein the column decoder further comprises a plurality of pixel sensors, each pixel sensor of the plurality including:
a first storage element having a pixel terminal and a bus terminal;
a second storage element having a pixel terminal and a bus terminal;
a first pixel switch configured for selectively coupling a column input to the pixel terminal of the first storage element;

a second pixel switch configured for selectively coupling the column input to the pixel terminal of the second storage element;
a crowbar switch configured for selectively coupling the pixel terminal of the first storage element to the pixel terminal of the second storage element; and
a column selector configured for selectively coupling the bus terminal of the first storage element to the first pixel signal and selectively coupling the bus terminal of the second storage element to the second pixel signal.

29. The imaging system of claim 27, further comprising an optical receiver configured to receive and modify incident light and present the modified light to the sensor array.

30. The imaging system of claim 27, further comprising:
a memory configured for storing a digital representation of an image captured by the sensor array; and
a communication interface configured for communicating the digital representation to an external device.

* * * * *